(12) United States Patent
Boaz

(10) Patent No.: US 6,180,921 B1
(45) Date of Patent: Jan. 30, 2001

(54) WINDSHIELD HEATING DEVICE

(75) Inventor: Premakaran Tucker Boaz, Livonia, MI (US)

(73) Assignee: Visteon Global Technologies, Inc., Dearborn, MI (US)

(*) Notice: Under 35 U.S.C. 154(b), the term of this patent shall be extended for 0 days.

(21) Appl. No.: 09/416,521

(22) Filed: Oct. 8, 1999

(51) Int. Cl.⁷ ........................................... B60L 1/02
(52) U.S. Cl. ........................ 219/203; 338/306; 338/314
(58) Field of Search ................................. 219/203, 211, 219/212, 213, 217, 522, 528, 543, 544, 546, 547, 549; 338/306, 307, 308, 309, 310, 311, 312, 313, 314

(56) References Cited

U.S. PATENT DOCUMENTS

| | | |
|---|---|---|
| 2,675,456 | 4/1954 | Cleminson et al. . |
| 3,623,906 | 11/1971 | Akeyoshi et al. . |
| 3,918,783 | 11/1975 | DuRocher et al. . |
| 3,982,092 | 9/1976 | Marriott . |
| 4,209,687 | 6/1980 | Bethge et al. . |
| 4,361,751 * | 11/1982 | Criss et al. ........................... 219/203 |
| 4,453,669 | 6/1984 | Karla et al. . |
| 4,455,481 | 6/1984 | Van Hoof et al. . |
| 4,864,100 | 9/1989 | Cicak . |
| 4,874,930 | 10/1989 | Voss et al. . |
| 4,910,380 * | 3/1990 | Reiss et al. ........................... 219/203 |
| 4,918,288 * | 4/1990 | Carter et al. ......................... 219/203 |
| 4,920,254 * | 4/1990 | DeCamp et al. ...................... 219/547 |
| 5,070,230 * | 12/1991 | Osada et al. ......................... 219/203 |
| 5,099,104 * | 3/1992 | Holzer et al. ........................ 219/203 |
| 5,099,105 * | 3/1992 | Goerenz et al. ..................... 219/203 |
| 5,130,842 * | 7/1992 | Gauthier et al. ..................... 219/203 |
| 5,208,095 * | 5/1993 | Nietering ............................. 219/203 |
| 5,418,025 | 5/1995 | Harmand et al. . |
| 5,434,384 | 7/1995 | Koontz . |
| 5,493,102 * | 2/1996 | Takase et al. ........................ 219/547 |
| 5,650,208 * | 7/1997 | Chaussade et al. .................. 219/203 |
| 5,824,993 * | 10/1998 | Chrysochoos et al. .............. 219/203 |
| 5,850,070 * | 12/1998 | Gillner et al. ........................ 219/203 |
| 5,877,473 | 3/1999 | Koontz . |
| 5,902,505 * | 5/1999 | Finley .................................. 219/547 |
| 5,904,874 * | 5/1999 | Winter ................................. 219/544 |

* cited by examiner

*Primary Examiner*—Teresa Walberg
*Assistant Examiner*—Fadi H. Dahbour
(74) *Attorney, Agent, or Firm*—Larry I. Shelton

(57) ABSTRACT

A heating device for heating a windshield of a vehicle includes a first layer adapted to be mounted to a fourth surface of a windshield. The heating device also includes at least one resistance element embedded in the first layer for connection to a source of power to heat a predetermined area of the windshield.

17 Claims, 1 Drawing Sheet

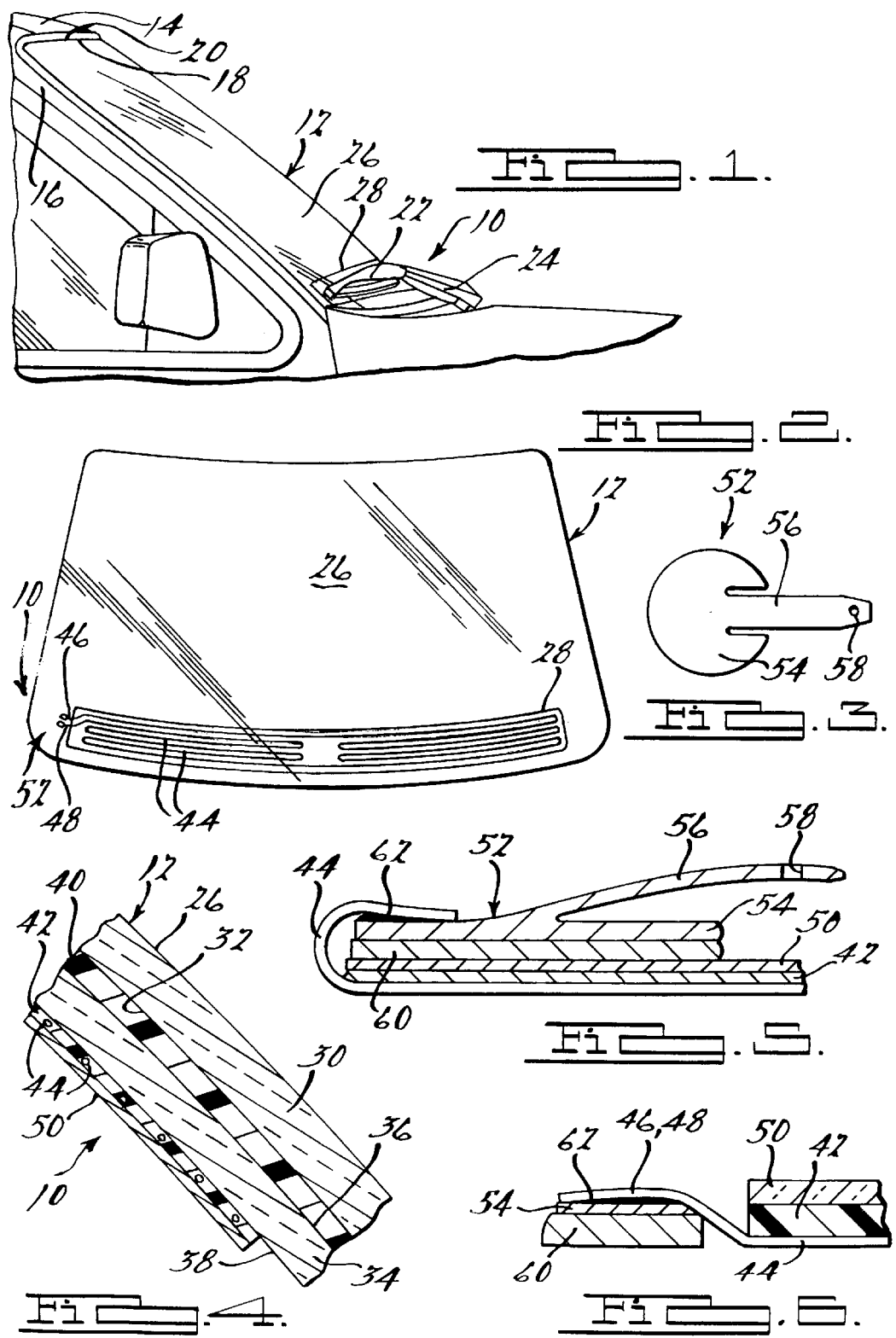

WINDSHIELD HEATING DEVICE

BACKGROUND OF THE INVENTION

1. Field of the Invention

The present invention relates generally to windshields for vehicles and, more particularly, to a heating device for a windshield of a vehicle.

2. Description of the Related Art

It is known to provide a windshield for a front opening in a vehicle body of a vehicle. Typically, the windshield includes two glass panels or sheets laminated to each other by an adhesive film or interlayer therebetween. It is also known to provide wipers to wipe an outer surface of the windshield. Typically, the wipers are pivotally mounted to the vehicle body and rest against the outer surface of the windshield in a wiper rest area at a bottom thereof. During cold weather conditions, these windshields and wipers can become covered with snow and ice. As a result, it is desirable to de-ice the windshield and/or wipers.

For de-icing purposes, it is known to provide a heating element for heating the wiper rest area of the windshield. An example of such a heating element is disclosed in U.S. Pat. No. 5,877,473. In this patent, a heating element is positioned on an inner or second surface of an outer glass sheet and held in position by the interlayer securing the inner and outer glass sheets together. The heating element has extensions extending beyond the edge of the windshield to provide external electrical access to power the heating element to heat the wiper rest area of the windshield.

Although the above heating element has worked, it is desirable to mount a heating device on an inner or fourth surface of the inner glass sheet. It is also desirable to heat specific areas of the windshield for de-icing purposes. It is further desirable to provide a heating device as a decal that can be applied to any windshield. Therefore, there is a need in the art to provide a heating device for a windshield of a vehicle that meets these desires.

SUMMARY OF THE INVENTION

Accordingly, the present invention is a heating device for heating a windshield of a vehicle includes a first layer adapted to be mounted to a fourth surface of a windshield. The heating device also includes at least one resistance element embedded in the first layer for connection to a source of power to heat a predetermined area of the windshield.

One advantage of the present invention is that a heating device is provided for a windshield of a vehicle to heat specific areas of the windshield. Another advantage of the present invention is that the heating device is a decal to heat glass sheets, and in particular, the windshield and other windows of the vehicle. Yet another advantage of the present invention is that the heating device is mounted to the fourth or inner glass sheet surface to heat a wiper rest area of the windshield for de-icing purposes. Still another advantage of the present invention is that the heating device includes wires embedded in a substrate and eliminates heating elements disposed between the glass sheets of the windshield. A further advantage of the present invention is that production of the windshield for the vehicle is simplified.

Other features and advantages of the present invention will be readily appreciated, as the same becomes better understood after reading the subsequent description when taken in conjunction with the accompanying drawings.

BRIEF DESCRIPTION OF THE DRAWINGS

FIG. 1 is an elevational view of a heating device, according to the present invention, illustrated in operational relationship with a windshield of a vehicle.

FIG. 2 is a front elevational view of the heating device and windshield of FIG. 1.

FIG. 3 is a front elevational view of a terminal for the heating device of FIG. 1.

FIG. 4 is a fragmentary side elevational view of the heating device and windshield of FIG. 1.

FIG. 5 is a fragmentary elevational view of the terminal of the heating device and windshield of FIG. 1.

FIG. 6 is a fragmentary elevational view of another embodiment of the terminal of the heating device and windshield of FIG. 1.

DESCRIPTION OF THE PREFERRED EMBODIMENT(S)

Referring to the drawings and in particular to FIGS. 1 and 2, one embodiment of a heating device 10, according to the present invention, is illustrated in operational relationship with a windshield, generally indicated at 12, for a vehicle 14 such as a motor vehicle. The vehicle 14 includes a vehicle body 16 having a front opening 18. The windshield 12 is disposed in the front opening 18 and secured therein to the vehicle body 16 by suitable means such as a seal 20. The vehicle 14 also includes at least one, preferably a pair of wipers 22 pivotally mounted to the vehicle body 16 by suitable means such as a pivotal wiper arm 24. The wipers 22 rest against an outer or first surface 26 of the windshield 12 in a wiper rest area 28 at a bottom thereof. The heating device 10 is disposed in the wiper rest area 28 of the windshield 12 to heat the wiper rest area 28. It should be appreciated that, except for the heating device 10, the vehicle 14 is conventional and known in the art.

Referring to FIGS. 2 through 5, the windshield 12 includes a first or outer glass panel or sheet 30. The outer glass sheet 30 has a first side or outer surface 26 and a second side or inner surface 32. The windshield 12 also includes a second or inner glass panel or sheet 34. The inner glass sheet 34 has a third side or outer surface 36 and a fourth side or inner surface 38. The windshield 12 includes an adhesive film or interlayer 40 disposed between the outer glass sheet 30 and inner glass sheet 34 and secured to the second surface 32 and third surface 36. The adhesive film 40 is preferably polyvinyl butyl (PVB). It should be appreciated that the outer and inner glass sheets 30 and 34 have a thickness greater than the interlayer 40 and are conventional and known in the art.

The heating device 10 includes a first layer 42 applied to the fourth surface 38 of the windshield 12. The first layer 42 is generally rectangular in shape, but may be any suitable shape. The first layer 42 is made of a plastic material, preferably polyvinyl butyl (PVB). The first layer 42 has a predetermined thickness such as 0.030 inches. The first layer 42 is attached to the fourth surface 38 of the windshield in a manner to be described.

The heating device 10 also includes at least one, preferably a plurality of resistance elements 44 embedded in the first layer 42. The resistance elements 44 are disposed between inner and outer surfaces of the first layer 42. The resistance elements 44 are preferably resistance wire formed as a single wire having a first end 46 and a second end 48 projecting outside of or beyond the first layer 42. The resistance between the first end 46 and the second end 48 is of a predetermined resistance, preferably between 0.8 to 1.0 ohms. The material and size of the wire of the resistance elements 44 are selected so that a predetermined level of energy is applied to the glass sheets 30 and 34. The resistance elements 44 are formed in a predetermined pattern to generate heat in a specific area of the windshield 12.

The heating device 10 includes a second layer 50 laminated to the first layer 42 to form a composite decal. The second layer 50 is also generally rectangular in shape, but may be any suitable shape. The second layer 50 is made of a plastic material, preferably polyester. The second layer 50 has a predetermined thickness such as 0.007 inches. The second layer 50 acts as a substrate to protect the first layer from foreign contaminants. The second layer 50 and first layer 42 are transparent or translucent. It should be appreciated that, while the heating device 10 is located in the wiper rest area 28 of the windshield 12, the heating device 10 may be located on any area of the fourth surface 38 or a window other than the windshield 12.

The heating device 10 further includes a terminal, generally indicated at 52, attached to each one of the first end 46 and second end 48 of the resistance elements 44. The terminal 52 includes a plate portion 54 and a terminal portion 56 extending outwardly from the plate portion 54. The plate portion 54 is made of a metal material, preferably copper. The terminal portion 56 is made of a metal material, preferably copper plated with nickel. The plate portion 54 is generally circular in shape, but may have any suitable shape. The terminal portion 56 is generally rectangular in shape, but may have any suitable shape. The terminal portion 56 includes an aperture 58 extending therethrough for connection by suitable means such as wires (not shown) to a source of power (not shown). The plate portion 54 and terminal portion 56 are formed as a monolithic structure being integral, unitary and one-piece. The terminal 52 has a predetermined size or diameter such as one inch.

The terminal 52 also includes an attachment layer 60 disposed between the plate portion 54 and the second layer 50 as illustrated in FIG. 5. In another embodiment illustrated in FIG. 6, the attachment layer 60 may be disposed between the plate portion 54 and the fourth surface 38. The attachment layer 60 is made of a plastic material, preferably polyvinyl butyl. The first end 46 and second end 48 are each attached to the plate portion 54 of their respective terminal 52 by suitable means such as solder 62.

To assemble the heating device 10, the heating device 10 is attached to the fourth side or surface 38 of the windshield 12 before it is laminated in a conventional autoclave (not shown) by an autoclaving process known in the art. The autoclaving process completes the attachment of the heating device 10 to the fourth surface 38 of the windshield 12. It should be appreciated that the heating device 10 does not require elaborate tooling for each specific windshield but can be applied as a decal to any windshield.

In operation, the heating device 10 is attached to the fourth surface 38 of the windshield 12. Power from the power source applies power through the terminals 52 to the resistance elements 44. The resistance elements 44 generate heat and heat the wiper rest area 28 of the windshield 12 to de-ice the wipers 22 and/or windshield 12 during cold weather conditions. It should be appreciated that the heating device 10 may be activated automatically by a sensor (not shown) or manually by a switch (not shown). It should also be appreciated that the heating device 10 may be used for other areas of the windshield 12 and windows of the vehicle 14.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A heating device for heating a vehicle windshield having an outer surface and an inner surface comprising:
    a first layer adapted to be mounted to the inner surface of a windshield;
    at least one resistance element embedded in said first layer for connection to a source of power to heat a predetermined area of the windshield; and
    wherein said first layer is made of a polyvinyl butyl material.

2. A heating device as set forth in claim 1 including a second layer laminated to said first layer.

3. A heating device as set forth in claim 2 wherein said second layer is made of a polyester material.

4. A heating device as set forth in claim 1 wherein said at least one resistance element is made of a wire material.

5. A heating device as set forth in claim 1 wherein said at least one resistance element has a first end and a second end.

6. A heating device as set forth in claim 5 including a terminal connected to each of said first end and said second end.

7. A heating device as set forth in claim 6 wherein said terminal comprises a plate portion for connection to a source of power.

8. A heating device as set forth in claim 7 wherein said terminal includes an attachment layer to attach said terminal to the windshield.

9. A heating device for heating a vehicle windshield having an outer surface and an inner surface comprising:
    a first layer adapted to be mounted to the inner surface of a windshield;
    at least one resistance element embedded in said first layer for connection to a source of power to heat a predetermined area of the windshield;
    said at least one resistance element having a first end and a second end;
    a terminal connected to each of said first end and said second end;
    said terminal including an attachment layer to attach said terminal to the windshield; and
    wherein said attachment layer is made of a polyvinyl butyl material.

10. A heatable windshield assembly for a vehicle comprising:
    an outer glass sheet having an outer surface and an inner surface;
    an inner glass sheet having an outer surface and an inner surface;
    an interlayer disposed between and secured to said inner surface of said outer glass sheet and said outer surface of said inner glass sheet;
    a heating device mounted on said inner surface of said inner glass sheet to heat a specific area thereof;
    said heating device including a first layer mounted to said inner surface of said inner glass sheet; and
    wherein said first layer is made of a polyvinyl butyl material.

11. A heatable windshield assembly as set forth in claim 10 wherein said heating device includes at least one resistance element embedded in said first layer for connection to a source of power.

12. A heatable windshield assembly as set forth in claim 11 including a second layer laminated to said first layer.

13. A heatable windshield assembly as set forth in claim 12 wherein said second layer is made of a polyester material.

14. A heatable windshield assembly as set forth in claim 11 wherein said at least one resistance element is made of a wire material.

15. A heatable windshield assembly as set forth in claim 11 including a terminal connected to each end of said at least one resistance element.

16. A heatable windshield assembly for a vehicle comprising:

an outer glass sheet having a first outer surface and a a first inner surface;

an inner glass sheet having a a second outer surface and a a second inner surface;

an interlayer disposed between and secured to said first inner surface and said second outer surface;

a first layer comprising a polyvinyl butyl material mounted to said second inner surface;

a plurality of resistance elements embedded in said first layer for connection to a source of power to heat a predetermined area of the windshield; and a second layer comprising a polyester material laminated to said first layer.

17. A heatable windshield assembly as set forth in claim 16 wherein said resistance elements have a first end and a second end and including a terminal connected to each of said first end and said second end.

* * * * *